US008694939B1

(12) United States Patent
Frost et al.

(10) Patent No.: US 8,694,939 B1
(45) Date of Patent: Apr. 8, 2014

(54) METHOD FOR DETERMINING CRITICAL JUNCTION TEMPERATURE

(71) Applicant: Xilinx, Inc., San Jose, CA (US)

(72) Inventors: Alan M. Frost, Cupertino, CA (US); Matthew H. Klein, Redwood City, CA (US); Ronald L. Cline, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/802,181

(22) Filed: Mar. 13, 2013

(51) Int. Cl.
*G06F 17/50* (2006.01)

(52) U.S. Cl.
USPC ............ 716/117; 716/122; 716/133; 716/136

(58) Field of Classification Search
USPC ......................................... 716/117, 133, 136
See application file for complete search history.

(56) References Cited

U.S. PATENT DOCUMENTS

| | | | |
|---|---|---|---|
| 4,329,726 A * | 5/1982 | Middleman et al. ............ | 361/58 |
| 8,019,580 B1 * | 9/2011 | Chandra et al. ................... | 703/6 |
| 2012/0074915 A1 * | 3/2012 | Lin et al. ........................ | 323/234 |
| 2012/0304137 A1 * | 11/2012 | Pramono et al. .............. | 716/109 |
| 2012/0323400 A1 * | 12/2012 | Sankar et al. ................. | 700/300 |
| 2013/0073875 A1 * | 3/2013 | Anderson et al. ............. | 713/300 |
| 2013/0132972 A1 * | 5/2013 | Sur et al. ........................ | 718/105 |

OTHER PUBLICATIONS

Vassighi, A., et al. "Thermal Runaway in Integrated Circuits", IEEE Transactions on Device and Materials Reliability, vol. 6, No. 2, Jun. 2006, pp. 300-305.
Vassighi, A., et al. "Thermal Runaway Avoidance during Burn-in", IEE04CH37533 42$^{nd}$ Annual International Reliability Physics Symposium, Phoenix, 2004, pp. 655-656.

* cited by examiner

*Primary Examiner* — Vuthe Siek
*Assistant Examiner* — Brian Ngo
(74) *Attorney, Agent, or Firm* — Gerald Chan (57) ABSTRACT

A method for determining a critical junction temperature for a user-design implemented in a field programmable gate array (programmable device), includes: obtaining a static power vs. temperature curve for the user-design implemented in the programmable device; obtaining a system thermal curve for the user-design implemented in the programmable device; and using the static power vs. temperature curve for the user-design implemented in the programmable device and the system thermal curve for the user-design implemented in the programmable device to determine the critical junction temperature.

19 Claims, 6 Drawing Sheets

METHOD FOR DETERMINING CRITICAL JUNCTION TEMPERATURE

FIELD

An embodiment described herein relates generally to determining critical junction temperature in a programmable device.

BACKGROUND

Components of integrated circuits exhibit leakage characteristics that affect the performance of the integrated circuit. Leakage characteristics are dependent on the junction temperature of the integrated circuit as well as process corners and voltage variations associated with the integrated circuit. The junction temperature of the integrated circuit is dependent on the design of the integrated circuit, the operating characteristics of the integrated circuit, and the system thermal characteristics of the environment in which the integrated circuit is operating.

Thermal runaway is a phenomenon that occurs in integrated circuits where the junction temperature of the integrated circuit reaches a point (e.g., critical junction temperature) where a stable operating temperature for the integrated circuit cannot be achieved. Once the critical junction temperature is reached, any additional increase in junction temperature leads to an increase in leakage current that further increases the junction temperature and so on, resulting in thermal runaway that may lead to misbehavior of the integrated circuit, damage to the integrated circuit, current limit shutdown, etc. At the critical junction temperature, any increase in leakage current from elevating junction temperature becomes greater than the system's ability to dissipate the heat from that increase.

Programmable devices can be programmed by a user to perform various functions. One type of programmable device is a Field Programmable Gate Array (FPGA), which falls within a category of integrated circuits known as programmable logic devices (PLDs). FPGAs can be programmed for a specific application by configuring interconnects and logic elements of the FPGA in accordance with a user-design.

In some cases, vendors of programmable devices may provide an IC curve that illustrates the leakage characteristics of the programmable device. However, these IC curves are general to the programmable device and not specific to the user-design or user programming for the programmable device. Said otherwise, the same IC curve is provided for every programmable device of the same type without accounting for the specific user-design to be implemented in the programmable device. However, different user-designs on the same programmable device may have different leakage characteristics. This is because different user-designs implement different components (e.g., Transceivers, BRAM, Clock managers, etc.) of the programmable device, resulting in unique leakage current characteristics.

Because vendors cannot account for every user-design, they may provide IC curves that illustrate leakage characteristics generally for typical or worst case scenarios of the programmable device to the end user, where the end user may need to perform its own empirical testing to determine the critical junction temperature for its specific user-design. In addition, these generic IC curves are usually only provided over a recommended operating temperature range. The critical junction temperature may lie beyond the operating temperature range, which would cause concern when a system or environmental change causes the junction temperature to temporarily rise beyond the operating range.

SUMMARY

A method for determining a critical junction temperature for a user-design implemented in a programmable device, includes: obtaining a static power vs. temperature curve for the user-design implemented in the programmable device; obtaining a system thermal curve for the user-design implemented in the programmable device; and using the static power vs. temperature curve for the user-design implemented in the programmable device and the system thermal curve for the user-design implemented in the programmable device to determine the critical junction temperature.

Optionally, one or both of the acts of obtaining may comprise: receiving the user-design; and receiving activity information associated with the user-design implemented in the programmable device.

Optionally, the user-design may identify which components of the programmable device are being utilized and which components of the programmable device are unused.

Optionally, the user-design may identify how components of the programmable device are routed or interconnected.

Optionally, the activity information associated with the user-design may comprise one or more of a clock frequency, a transceiver operating rate, a switching characteristic, an enable rate, and a dynamic power gating rate.

Optionally, the act of obtaining the static power vs. temperature curve for the user-design implemented in the programmable device may comprise: determining a plurality of models that model leakage current characteristics for individual components of the user-design implemented in the programmable device based on the user-design and the activity information; and determining a composite of the models for the individual components of the user-design implemented in the programmable device.

Optionally, the act of obtaining the system thermal curve may comprise determining the system thermal curve using the user-design, activity information associated with the user-design implemented in the programmable device, and external system characteristics for the user-design implemented in the programmable device.

Optionally, the method may further include determining the external system characteristics for the user-design implemented in the programmable device, wherein the external system characteristics for the user-design implemented in the programmable device are determined from system thermal information provided by an end-user of the user-design implemented in the programmable device.

Optionally, the system thermal information may comprise a thermal simulation of an external system for the user-design implemented in the programmable device.

Optionally, the system thermal information may comprise guidelines that approximate an external system for the user-design implemented in the programmable device.

Optionally, the external system characteristics may include one or more of an ambient temperature, an airflow characteristic, a heatsink characteristic, and a board characteristic, of an external system for the user-design implemented in the programmable device.

Optionally, the act of obtaining the system thermal curve for the user-design implemented in the programmable device may comprise obtaining alternative system thermal curves for different applications of the user-design implemented in the programmable device.

Optionally, the critical junction temperature may occur at a point along the static power vs. temperature curve having a slope that is parallel to a slope of the system thermal curve.

Optionally, the system thermal curve may indicate a temperature or a temperature change of an external system for the user-design implemented in the programmable device as a function of power usage.

Optionally, the programmable device may be a Field Programmable Gate Array (FPGA).

A computer program product embodied on a computer readable non-transitory medium, the computer readable medium having stored thereon a sequence of instructions which, when executed by a processor causes the processor to execute a method for determining a critical junction temperature for a user-design implemented in a programmable device, the method includes: obtaining a static power vs. temperature curve for the user-design implemented in the programmable device; obtaining a system thermal curve for the user-design implemented in the programmable device; and using the static power vs. temperature curve for the user-design implemented in the programmable device and the system thermal curve for the user-design implemented in the programmable device to determine the critical junction temperature.

Optionally, the act of obtaining the static power vs. temperature curve for the user-design implemented in the programmable device may comprise: determining a plurality of models that model leakage current characteristics for individual components of the user-design implemented in the programmable device based on the user-design and the activity information; and determining a composite of the models for the individual components of the user-design implemented in the programmable device.

Optionally, the act of obtaining the system thermal curve may comprise determining the system thermal curve using the user-design, activity information, and external system characteristics.

Optionally, the act of obtaining the system thermal curve for the user-design implemented in the programmable device may comprise obtaining alternative system thermal curves for different applications of the user-design implemented in the programmable device.

Optionally, the critical junction temperature may be determined to be at a point along the static power vs. temperature curve having a slope that is parallel to a slope of the system thermal curve.

Other and further aspects and features will be evident from reading the following detailed description.

BRIEF DESCRIPTION OF THE DRAWINGS

The drawings illustrate the design and utility of various features described herein, in which similar elements are referred to by common reference numerals. These drawings are not necessarily drawn to scale. In order to better appreciate how the above-recited and other advantages and objects are obtained, a more particular description will be rendered, which are illustrated in the accompanying drawings. These drawings depict only exemplary features and are not therefore to be considered limiting in the scope of the claims.

DETAILED DESCRIPTION

Various features are described hereinafter with reference to the figures. It should be noted that the figures are not drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated feature needs not have all the aspects or advantages shown. An aspect or an advantage described in conjunction with a particular feature is not necessarily limited to that feature and can be practiced in any other features even if not so illustrated.

Figure 1:
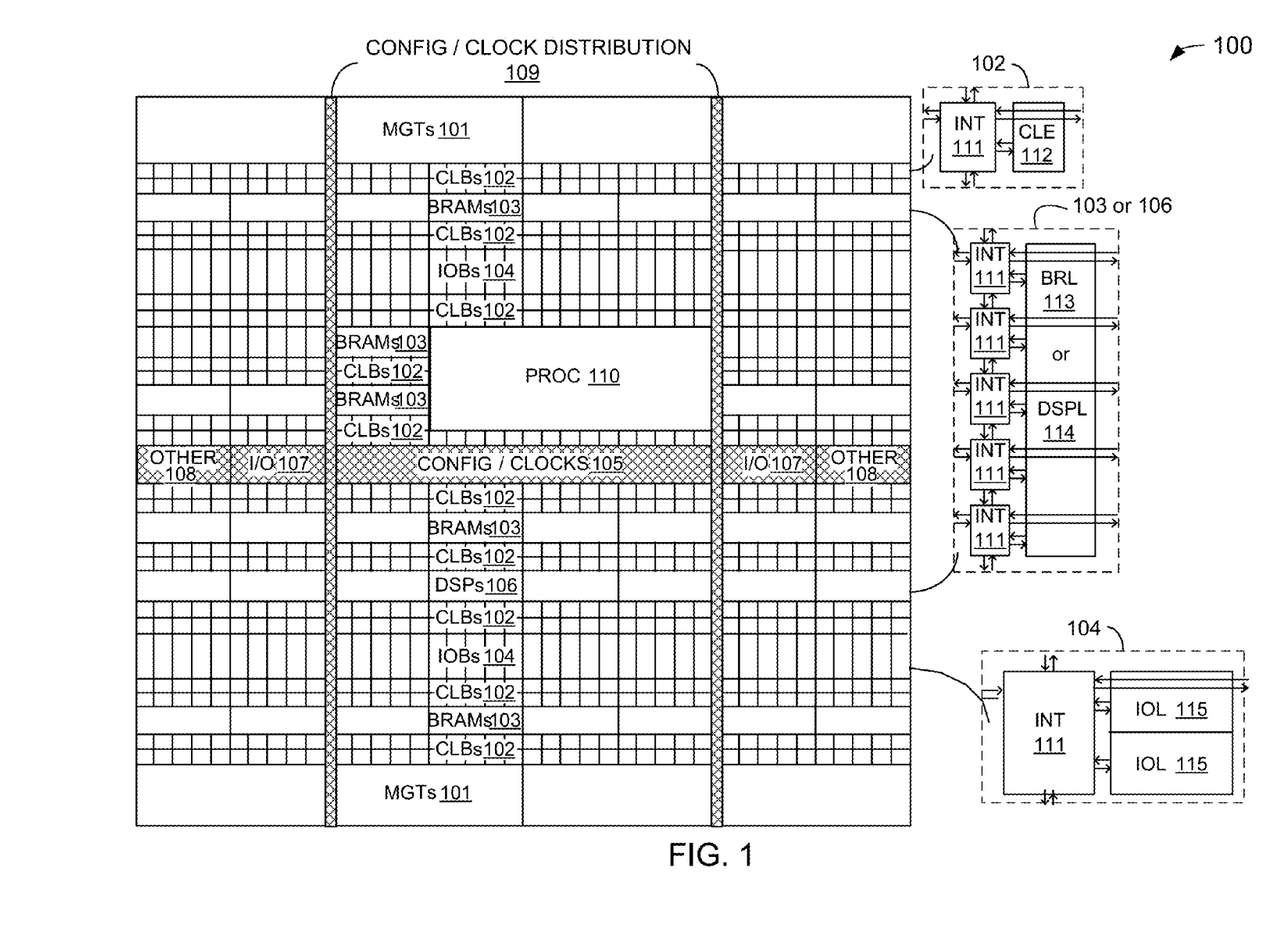
FIG. 1 is a simplified block diagram depicting an exemplary columnar Field Programmable Gate Array (FPGA) architecture.

FIG. 1 is a simplified block diagram depicting an exemplary columnar Field Programmable Gate Array (FPGA) architecture 100. The FPGA architecture 100 includes a large number of different programmable tiles including multi-gigabit transceivers (MGTs) 101, configurable logic block (CLBs) 102, random access memory blocks (BRAMs) 103, input/output blocks (IOBs) 103, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element (CLE) 112 that can be programmed to implement user logic plus a single programmable interconnect element (INT) 111. A BRAM 103 can include a BRAM logic element (BRL) 113 in addition to one or more programmable interconnect elements. Typically, the number of interconnect elements included in a tile depends on the height of the tile. In some cases, a BRAM tile has the same height as five CLBs, but other numbers (e.g., four) can also be used. A DSP tile 106 can include a DSP logic element (DSPL) 114 in addition to an appropriate number of programmable interconnect elements. An IOB 104 can include, for example, two instances of a input/output logic element (IOL) 115 in addition to one instance of the programmable interconnect element 111. As will be clear to those of skill in the art, the actual I/O pads connected, for example, to the I/O logic element 115 typically are not confined to the area of the input/output logic element 115.

In some cases, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

As mentioned above, it may be desirable to provide end users of FPGAs with the critical junction temperature for their specific user-design in order to ensure that thermal runaway does not occur.

Figure 2:
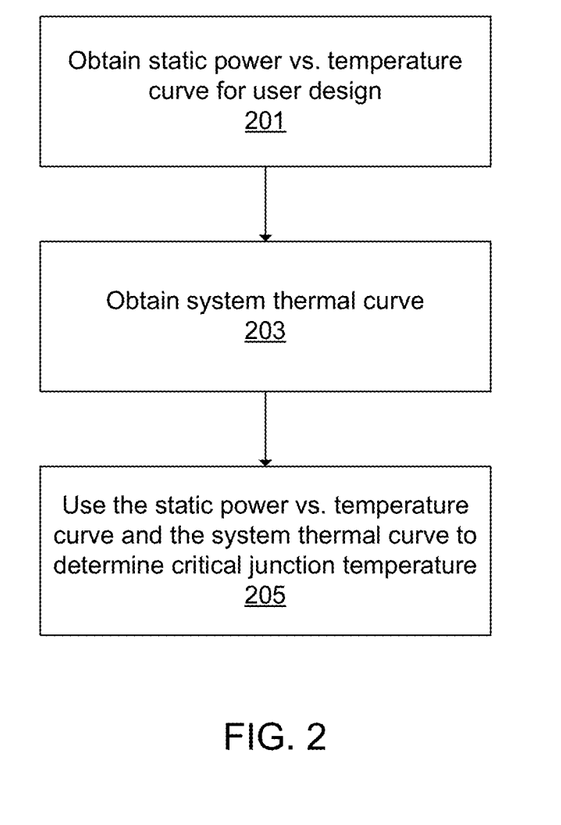
FIG. 2 is a flow diagram illustrating a method for determining critical junction temperature for a user-design implemented in an FPGA.

FIG. 2 is a flow diagram illustrating a method for determining critical junction temperature for a user-design implemented in an FPGA.

For a given user-design implemented an FPGA, a static power vs. temperature curve is first obtained as shown at item 201. The static power vs. temperature curve accounts for the leakage characteristics of the particular user design implemented in the FPGA. The static power vs. temperature curve sums the unique leakage characteristics for each voltage source being used for the user-design implemented in the FPGA. The unique leakage characteristics for each voltage source takes into account the leakage current for the voltage source with respect to the process, voltage and temperature (PVT) associated with the voltage source. The power-gating of unused features as well as other design implementation specific information is also used to obtain a static power vs. temperature curve that is unique to the user-design.

In some cases, the static power vs. temperature curve may be obtained by a processor that is configured to determine (e.g., construct) the static power vs. temperature curve based on one or more parameters. In order to determine a static power vs. temperature curve for the user-design implemented in the FPGA, a user design may first be received. The user design identifies which components of the FPGA are being utilized for the user-design and which components of the FPGA are to remain unused. For example the user design may identify which transceivers, BRAMs, Clock Managers, etc. are being utilized or not used for the user design. The user design may also identify how components are routed and interconnected. The user design may also indicate which voltage sources of the FPGA are being used as well as the process corners and voltage variations associated with each voltage source. Because the leakage current characteristics of the user-design is dependent on the utilization/non-use of the components of the FPGA as well as other design implementation specifics, the user-design is needed to determine the static power vs. temperature curve unique to the user-design implemented in the FPGA. This is in contrast to a general IC curve for the FPGA device provided by a conventional FPGA vender that does not account for user-design.

Activity information associated with the user-design implemented in the FPGA is also received and utilized to generate the static power vs. temperature curve for the user-design implemented in the FPGA. For example, a user design may not use certain blocks which can be power gated to minimize or eliminate the static power consumed in those unused blocks. Other activity information may include operating characteristics of the user-design implemented in the FPGA, such as clock frequencies, transceiver operating rates, switching characteristics, enable rates, dynamic power gating rates etc., which affects the leakage characteristics of the user design implemented in the FPGA by raising the junction temperature (i.e., where the device operates on the static power vs. temperature curve). Because the leakage current characteristics of the user-design implemented in the FPGA are dependent on the operating characteristics of the user-design implemented in the FPGA, the activity information for the user-design implemented in the FPGA is needed to determine the static power vs. temperature curve unique to the user-design implemented in the FPGA.

Physics-based models that model leakage current characteristics for individual components of the FPGA are then parameterized with the user design and activity information to model the static power vs. temperature curve for the user-design implemented in the FPGA. Individual components (e.g., voltage sources) of the user-design implemented in the FPGA may be independently modeled to obtain individual components models, and a final static power vs. temperature curve may be obtained by determining a composite of the individual components models. The physics-based models that model leakage current characteristics may take into account the process corners and voltage variations for each voltage source used in the user design.

In some cases, item 201 may be performed by a processor. For example, the processor may obtain the static power vs. temperature curve by determining the static power vs. temperature curve using the user design, activity information, and/or the physics-based models for the individual components. Alternatively, the processor may obtain the static power vs. temperature curve by receiving this information from another component, such as another processor or a non-transitory medium that stores information regarding the static power vs. temperature curve.

As shown in FIG. 2, next, a system thermal curve may then be obtained for the user-design implemented in the FPGA (item 203). In some cases, the system thermal curve may be obtained by a processor that is configured to determine (e.g., construct) the system thermal curve based on one or more parameters. The system thermal curve characterizes the thermal behavior of the system external to the user-design implemented in the FPGA and may be constructed using the user design and activity information associated with the user-design implemented in the FPGA, as well as external system characteristics. The system thermal curve expresses the temperature or temperature change of the external system as a function of power usage.

The thermal behavior of the system external to the FPGA is dependent on a number of factors or characteristics including an ambient temperature, an airflow characteristic, a heatsink characteristic, a board characteristic, and operating power of the user-design implemented in the FPGA. Some of these factors may be obtained from the user design and activity information. Some other of these factors may be obtained as system thermal information provided by the end user that illustrates external system characteristics. For example, the end user may perform thermal simulation of its external system to produce exact system thermal information. Alternatively, the end user may provide system thermal information as a set of guidelines that generally approximate external system characteristics. External system characteristics may be derived from the system thermal information.

In some cases, alternative system thermal curves may be obtained (e.g., constructed) for different types of use (e.g., different applications). For example, a user-design implemented in the FPGA being used in a commercial environment may exhibit a different system thermal curve than the same user-design implemented in the FPGA being used in an industrial environment.

In some cases, item 203 may be performed by a processor. For example, the processor may obtain the system thermal curve by determining the system thermal curve using the user design, and/or activity information. Alternatively, the processor may obtain the system thermal curve by receiving this information from another component, such as another processor or a non-transitory medium that stores information regarding the system thermal curve.

Once the static power vs. temperature curve for the specific user-design implemented in the FPGA and the system thermal curve have been constructed, these curves may then be used to determine the critical junction temperature as shown at item 205 in FIG. 2. The critical junction temperature occurs where the derivative (or slope) at a point along the static power vs. temperature curve is parallel to the system thermal curve. If the user-design implemented in the FPGA can operate below the critical junction temperature, the user-design implemented in the FPGA is guaranteed to be shielded from thermal runaway. However, if the user-design implemented in the FPGA reaches a temperature above the critical junction temperature during operation, then thermal runaway may occur. In some cases, item 205 may be performed using a processor.

As such, end users of user-design implemented in the FPGAs may compare the determined critical junction temperature for the user-design implemented in the FPGA to operating specifications to determine whether a probability of thermal runaway may exist. If the end users determine that the probability of thermal runaway exists based on the determined critical junction temperature and operating specifications, then the user-design implemented in the FPGA may need to undergo redesign, or the system external to the user-design implemented in the FPGA may need to undergo modification, to ensure that thermal runaway will not occur.

It should be noted that the order of items 201, 203, and 205 may be different from that shown in FIG. 2. For example, in other cases, item 203 may be performed before item 201, or simultaneously with item 201. Also, the method of FIG. 2 may be performed using a processor in some cases.

Figure 3:
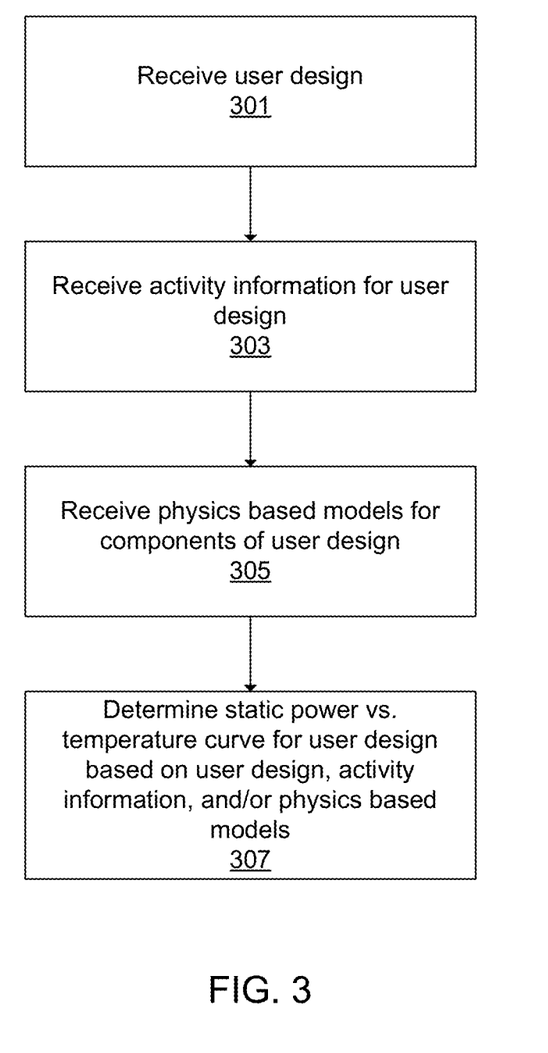
FIG. 3 is a flow diagram illustrating a method for determining a static power vs. temperature curve for a user-design implemented in a FPGA.

FIG. 3 is a flow diagram illustrating a method for determining a static power vs. temperature curve for a user-design implemented in a FPGA. The method of FIG. 3 may be an example of a technique for implementing item 201 of FIG. 2.

Initially, a user design is received as shown at item 301. The user design identifies which components of the FPGA are being utilized for the user-design and which components of the FPGA are to remain unused. For example the user design may identify which transceivers, BRAMs, Clock Managers, etc. are being utilized or not used for the user design. The user design may also identify how components are routed and interconnected. The user design may also indicate which voltage sources of the FPGA are being used as well as the process corners and voltage variations associated with each voltage source. Because the leakage current characteristics of the user-design implemented in the FPGA are dependent on the utilization/non-use of the components of the FPGA as well as other design implementation specifics, the user-design is needed to determine the static power vs. temperature curve unique to the user-design implemented in the FPGA. This is in contrast to conventional vendors who merely specify a general IC curve for the FPGA device that does not account for user-design.

Next, activity information associated with the user-design implemented in the FPGA may then be received as shown at item 303. Activity information may include operating characteristics of the user-design implemented in the FPGA including which blocks are used or unused, and whether any resources are power gated. Other activity information such as clock frequencies, transceiver operating rates, switching characteristics, enable rates, dynamic power gating rates, etc., may affect the leakage characteristics of the user design implemented in the FPGA by raising the junction temperature. Because the leakage current characteristics of the user-design implemented in the FPGA are dependent on the operating characteristics of the user-design implemented in the FPGA, the activity information for the user-design implemented in the FPGA is needed to determine the static power vs. temperature curve unique to the user-design implemented in the FPGA, and where along that curve the device will operate.

Next, physics-based models for components of the FPGA may then be received as shown at item 305. These physics-based models model leakage current characteristics for individual components (e.g., voltage sources) of the FPGA. For example, there may be different physics-based models for various transceivers, BRAMs, clock managers, etc. of the FPGA.

Next, the static power vs. temperature curve for the user-based design may then be determined based on the user-design, activity information, and physics-based models as shown at item 307. The physics-based models may be parameterized with the user design and activity information to model the static power vs. temperature curve for the user-design implemented in the FPGA. Individual components (e.g., voltage sources) of the user-design implemented in the FPGA may be independently modeled to obtain individual components models, with the final static power vs. temperature curve being determined as a composite of the individual components models. As mentioned above, these physics-based models that model leakage current characteristics may take into account the process corners and voltage variations for each voltage source in the user design.

In some cases, the static power vs. temperature curve may be constructed by determining a plurality of points that collectively form the static power vs. temperature curve. In other cases, the static power vs. temperature curve may be determined by determining a function that represents the static power vs. temperature curve. It should be noted that the static power vs. temperature curve may be displayed or stored in a non-transitory medium. Thus, as used in this specification, the term "curve" is not limited to a displayed object, and may refer to one or more values or variables, or a function, representing a curve stored in a non-transitory medium.

It should be noted that the order of items 301, 303, 305, and 307 may be different from that shown in FIG. 3. For example, in other cases, item 303 may be performed before item 301, or simultaneously with item 301. Also, the method of FIG. 3 may be performed using a processor in some cases.

Figure 4:
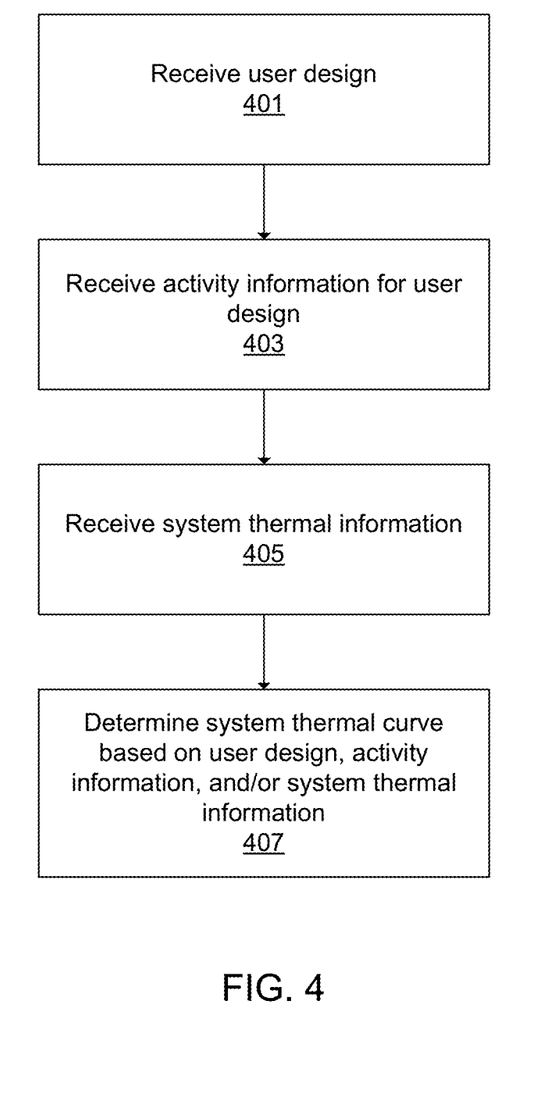
FIG. 4 is a flow diagram illustrating a method for determining a system thermal curve for a user-design implemented in the FPGA.

FIG. 4 is a flow diagram illustrating a method for determining a system thermal curve for a user-design implemented in a FPGA. The method of FIG. 4 may be an example of a technique for implementing item 203 of FIG. 2.

Initially, a user design is received as shown at item 401. The user design identifies which components of the FPGA are being utilized for the user-design and which components of the FPGA are to remain unused. For example the user design may identify which transceivers, BRAMs, Clock Managers, etc. are being utilized or not used for the user design. The user design may also identify how components are routed and interconnected. Because the thermal behavior of the system external to the FPGA is dependent on the utilization/non-use of the components of the FPGA, the user-design is needed to determine the system thermal curve unique to the user-design implemented in the FPGA.

Activity information associated with the user-design implemented in the FPGA may then be received as shown at item 403. Activity information may include operating characteristics of the user-design implemented in the FPGA, such as clock frequencies, transceiver operating rates, switching characteristics, enable rates, dynamic power gating rates, etc. Because the thermal behavior of the system external to the FPGA is dependent on the operating characteristics of the user-design implemented in the FPGA, the activity information for the user-design implemented in the FPGA is needed to determine the system thermal curve unique to the user-design implemented in the FPGA.

System thermal information may then be received as shown at item 405. System thermal information is utilized to determine external system characteristics. For example, system thermal information may include ambient temperature, airflow, heatsink, and board characteristics of the system external to the FPGA. Because the thermal behavior of the system external to the FPGA is dependent on the external system characteristics, the system thermal information is needed to determine the system thermal curve unique to the user-design implemented in the FPGA.

In some cases, the end user may perform thermal simulation of its external system to produce exact system thermal information. In other cases, the end user may provide system thermal information as a set of guidelines that generally approximate external system characteristics Finally, a system thermal curve may be determined for the user-design implemented in the FPGA as shown at item 407. The system thermal curve characterizes the thermal behavior of the system external to the user-design implemented in the FPGA and may be constructed using the user design and activity information associated with the user-design implemented in the FPGA, as well as external system characteristics. The system thermal curve expresses the temperature change of the external system as a function of power usage.

In some cases, the system thermal curve may be constructed by determining a plurality of points that collectively form the system thermal curve. In other cases, the system thermal curve may be determined by determining a function that represents the system thermal curve. It should be noted that the system thermal curve may be displayed or stored in a non-transitory medium. Thus, as used in this specification, the term "curve" is not limited to a displayed object, and may refer to one or more values or variables, or a function, representing a curve stored in a non-transitory medium.

It should be noted that the order of items 401, 403, 405, and 407 may be different from that shown in FIG. 4. For example, in other cases, item 403 or 405 may be performed before item 401, or simultaneously with item 401. Also, the method of FIG. 4 may be performed using a processor in some cases.

Figure 5:
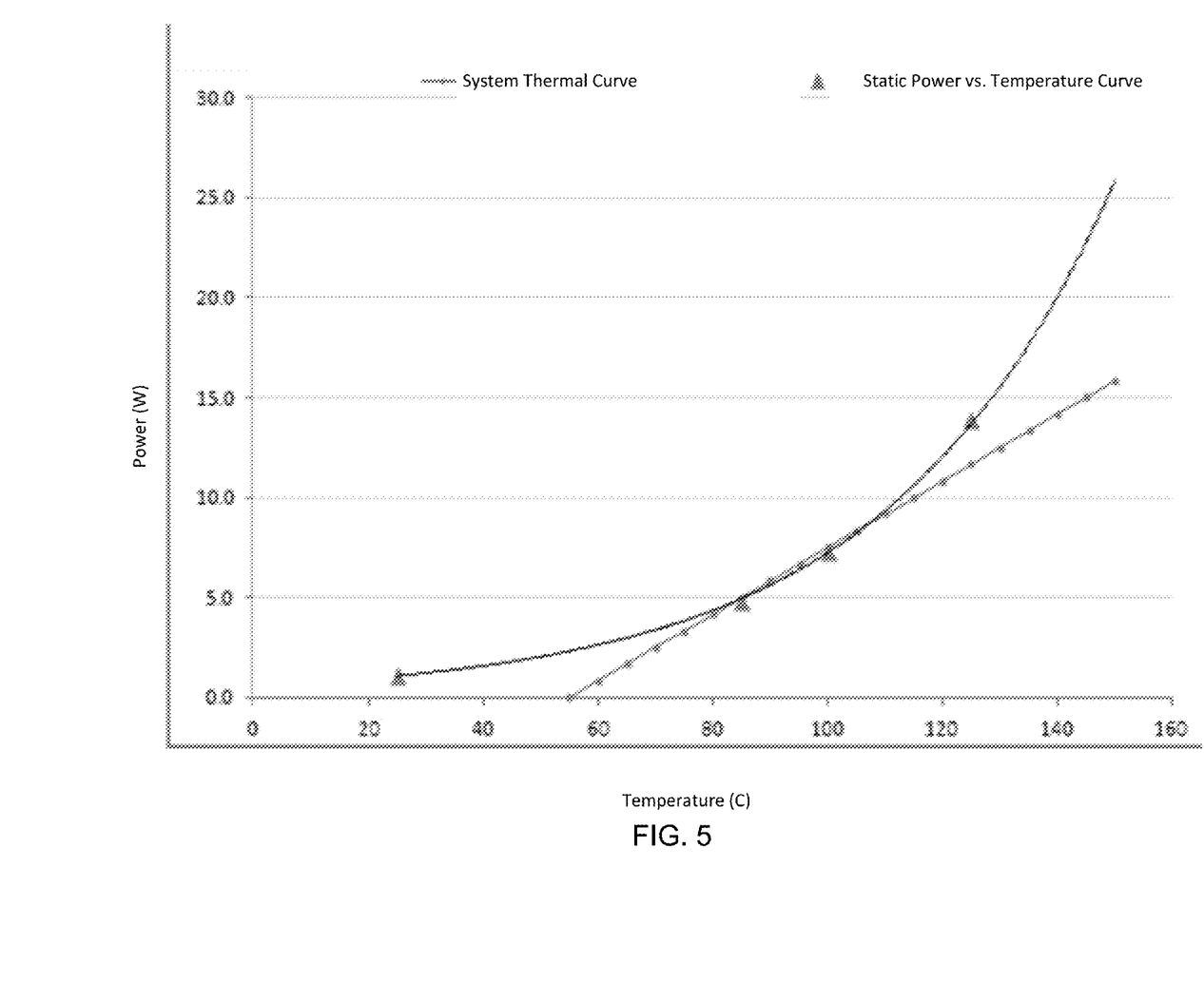
FIG. 5 is a graph illustrating an example of a static power vs. temperature curve and a system thermal curve for a user-design implemented in the FPGA.

FIG. 5 is a graph illustrating an example of a static power vs. temperature curve, and a system thermal curve, for a user-design implemented in an FPGA. The static power vs. temperature curve is depicted using the line formed by triangles. The system thermal curve is depicted using the line formed by circles.

The static power vs. temperature curve illustrated in FIG. 5 may be constructed using the method described above with reference to FIGS. 2 and 3. As mentioned above, the static power vs. temperature curve characterizes the leakage characteristics of the particular user-design implemented in the FPGA with respect to process, voltage and temperature.

The system thermal curve may be constructed using the method described above with reference to FIGS. 2 and 4. As mentioned above, the system thermal curve expresses the temperature change of the external system for the user-design implemented in the FPGA as a function of power usage.

Once the static power vs. temperature curve and the system thermal curve have been determined, these curves may then be used to determine the critical junction temperature. The critical junction temperature occurs at a point along the static power vs. temperature curve where the slope of the static power vs. temperature curve is parallel to the system thermal curve. In the illustrated example of FIG. 5, the critical junction temperature occurs at 94.0° C. In some cases, the critical junction temperature may be determined by a processor that calculates a derivative of the static power vs. temperature curve, and then compares the result with the slope of the system thermal curve to identify the critical junction temperature. In other cases, the processor may be configured to directly calculate the critical junction temperature based on the slope of the system thermal curve and data regarding the static power vs. temperature curve.

End users of user-design implemented in the FPGAs may then compare the specified critical junction temperature (e.g., 94.0° C. in the illustrated example) for the user-design implemented in the FPGA with operating specifications to determine whether a probability of thermal runaway may exist.

Figure 6:
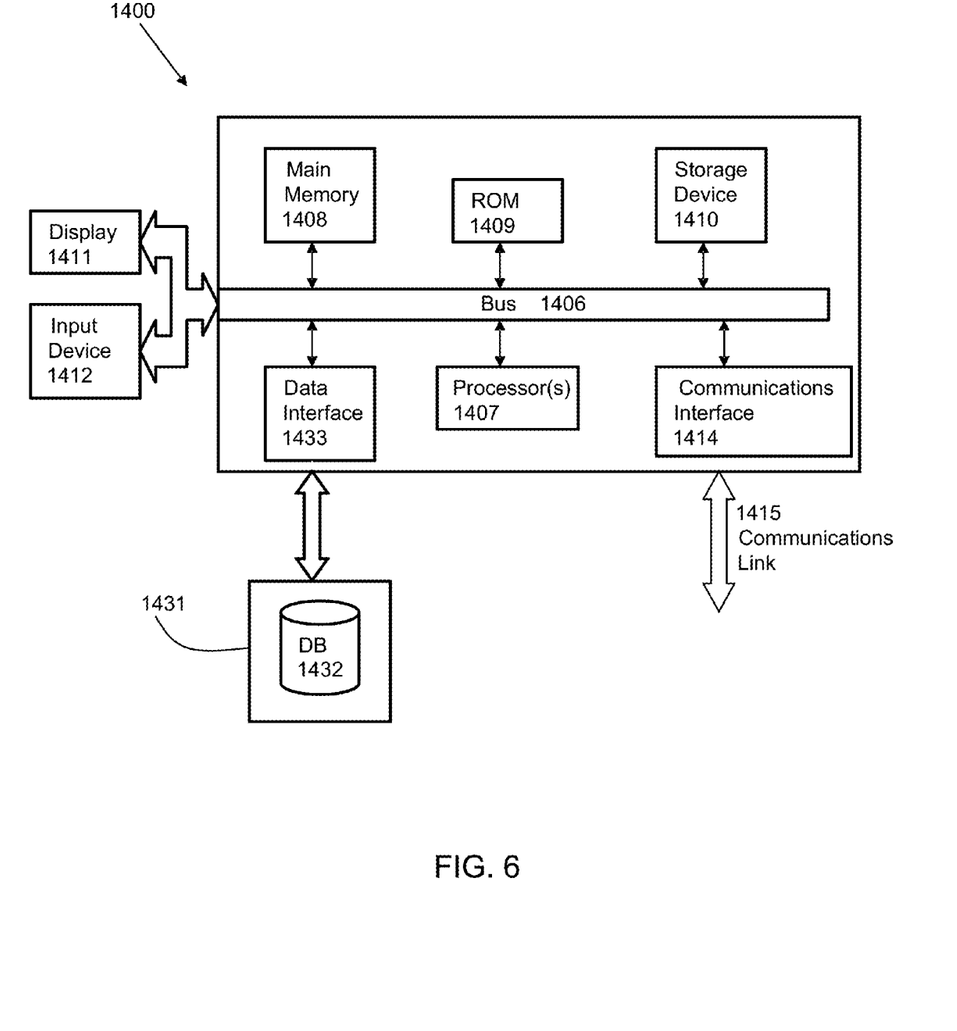
FIG. 6 is a block diagram of a computing system suitable for implementing one or more features described herein.

FIG. 6 is a block diagram of an illustrative computing system 1400 suitable for implementing one or more features described herein. In some cases, the computing system 1440 may be used to construct a leakage vs. temperature curve as discussed with reference to item 201 in FIG. 2, construct a system thermal curve as discussed with reference to item 203, and/or compare the derivative of leakage vs. temperature curve with the system thermal curve as discussed with reference to item 205. Also, in some cases, the computing system 1400 may be used to perform the method of FIG. 3, or any part(s) thereof. In other cases, the computing system 1400 may be used to perform the method of FIG. 4, or any part(s) thereof.

Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

In some cases, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In other cases, hard-wired circuitry may be used in place of or in combination with software instructions to implement one or more features described herein. Thus, features described herein are not limited to any specific combination of hardware circuitry and/or software. In some cases, the term "logic" shall mean any combination of software or hardware that is used to implement one or more features described herein.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. Both volatile media and non-volatile media may be considered examples of non-transitory media.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some cases, execution of the sequences of instructions to practice one or more features described herein is performed by a single computer system 1400. In other cases, two or more computer systems 1400 coupled by communication link 1415 (e.g., LAN, PSTN, or wireless network) may perform the sequence of instructions required to practice one or more features described herein in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

Although particular features have been shown and described, it will be understood that they are not intended to limit the claimed invention, and it will be made obvious to those skilled in the art that various changes and modifications may be made without departing from the spirit and scope of the claimed invention. For instance, while some embodiments may have been described using an FPGA as an example, it is contemplated and understood that any suitable programmable device is within the scope of the invention. The specification and drawings are, accordingly to be regarded in an illustrative rather than restrictive sense. The claimed invention is intended to cover all alternatives, modifications and equivalents.

The invention claimed is:

1. A method for determining a critical junction temperature for a user-design implemented in a programmable device, comprising:
   obtaining a static power vs. temperature curve for the user-design implemented in the programmable device;
   obtaining, by using a processor, a system thermal curve for the user-design implemented in the programmable device;
   wherein the system thermal curve indicates a temperature or a temperature change of an external system for the user-design implemented in the programmable device as a function of power usage; and
   using the static power vs. temperature curve for the user-design implemented in the programmable device and the system thermal curve for the user-design implemented in the programmable device to determine the critical junction temperature.

2. The method of claim 1, wherein one or both of the acts of obtaining comprise:
   receiving the user-design; and
   receiving activity information associated with the user-design implemented in the programmable device.

3. The method of claim 2, wherein the user-design identifies which components of the programmable device are being utilized and which components of the programmable device are unused.

4. The method of claim 2, wherein the user-design identifies how components of the programmable device are routed or interconnected.

5. The method of claim 2, wherein the activity information associated with the user-design comprises one or more of a clock frequency, a transceiver operating rate, a switching characteristic, an enable rate, and a dynamic power gating rate.

6. The method of claim 2, wherein the act of obtaining the static power vs. temperature curve for the user-design implemented in the programmable device comprises:
   determining a plurality of models that model leakage current characteristics for individual components of the user-design implemented in the programmable device based on the user-design and the activity information; and
   determining a composite of the models for the individual components of the user-design implemented in the programmable device.

7. The method of claim 1, wherein the act of obtaining the system thermal curve comprises determining the system thermal curve using the user-design, activity information associated with the user-design implemented in the programmable device, and external system characteristics for the user-design implemented in the programmable device.

8. The method of claim 7, further comprising determining the external system characteristics for the user-design implemented in the programmable device, wherein the external system characteristics for the user-design implemented in the programmable device are determined from system thermal information provided by an end-user of the user-design implemented in the programmable device.

9. The method of claim 8, wherein the system thermal information comprises a thermal simulation of an external system for the user-design implemented in the programmable device.

10. The method of claim 8, wherein the system thermal information comprises guidelines that approximate an external system for the user-design implemented in the programmable device.

11. The method of claim 7, wherein the external system characteristics include one or more of an ambient temperature, an airflow characteristic, a heatsink characteristic, and a board characteristic, of an external system for the user-design implemented in the programmable device.

12. The method of claim 1, wherein the act of obtaining the system thermal curve for the user-design implemented in the programmable device comprises obtaining alternative system thermal curves for different applications of the user-design implemented in the programmable device.

13. The method of claim 1, wherein the critical junction temperature occurs at a point along the static power vs. temperature curve having a slope that is parallel to a slope of the system thermal curve.

14. The method of claim 1, wherein the programmable device is a Field Programmable Gate Array (FPGA).

15. A computer program product embodied on a computer readable non-transitory medium, the computer readable medium having stored thereon a sequence of instructions which, when executed by a processor causes the processor to execute a method for determining a critical junction temperature for a user-design implemented in a programmable device, the method comprising:

obtaining a static power vs. temperature curve for the user-design implemented in the programmable device;

obtaining a system thermal curve for the user-design implemented in the programmable device;

wherein the system thermal curve indicates a temperature or a temperature change of an external system for the user-design implemented in the programmable device as a function of power usage; and using the static power vs. temperature curve for the user-design implemented in the programmable device and the system thermal curve for the user-design implemented in the programmable device to determine the critical junction temperature.

16. The computer program product of claim 15, wherein the obtaining the static power vs. temperature curve for the user-design implemented in the programmable device comprises:

determining a plurality of models that model leakage current characteristics for individual components of the user-design implemented in the programmable device based on the user-design and the activity information; and determining a composite of the models for the individual components of the user-design implemented in the programmable device.

17. The computer program product of claim 16, wherein the obtaining the system thermal curve comprises determining the system thermal curve using the user-design, activity information, and external system characteristics.

18. The computer program product of claim 15, wherein the act of obtaining the system thermal curve for the user-design implemented in the programmable device comprises obtaining alternative system thermal curves for different applications of the user-design implemented in the programmable device.

19. The computer program product of claim 15, wherein the critical junction temperature is determined to be at a point along the static power vs. temperature curve having a slope that is parallel to a slope of the system thermal curve.

* * * * *